(12) United States Patent
Baumgartner et al.

(10) Patent No.: US 8,764,050 B2
(45) Date of Patent: Jul. 1, 2014

(54) DEVICES FOR PASSENGER PROTECTION SYSTEMS OF A VEHICLE

(71) Applicant: Takata AG, Aschaffenburg (DE)

(72) Inventors: Peter Baumgartner, Günzburg (DE); Jens Feller, Illerkirchberg (DE); Axel Grüner, Langenau (DE); Philipp Fuchs, Senden (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/775,612

(22) Filed: Feb. 25, 2013

(65) Prior Publication Data

US 2013/0161946 A1    Jun. 27, 2013

Related U.S. Application Data

(63) Continuation of application No. PCT/EP2011/062577, filed on Jul. 21, 2011.

(30) Foreign Application Priority Data

Aug. 27, 2010   (DE) .......................... 10 2010 039 902

(51) Int. Cl.
*B60R 21/26*  (2011.01)
*B60R 21/20*  (2011.01)
*B25G 3/16*  (2006.01)
*F16B 7/20*  (2006.01)

(52) U.S. Cl.
USPC ................... 280/728.2; 280/742; 280/730.2; 403/349

(58) Field of Classification Search
USPC .................. 280/728.2, 742, 730.2, 732, 741; 403/349
See application file for complete search history.

(56) References Cited

U.S. PATENT DOCUMENTS 2,181,495 A * 11/1939 Novack .......................... 119/346
5,423,568 A *  6/1995 Zushi et al. ................ 280/728.2
(Continued)

FOREIGN PATENT DOCUMENTS

DE      94 08 908       5/1994
DE      298 01 104 U1   1/1998
(Continued)

OTHER PUBLICATIONS

Siegel, DE 103 39 523 English Machine Translation, Patent Publication Date Mar. 17, 2005 (translation printed Jun. 16, 2013).*

(Continued)

*Primary Examiner* — Karen Beck
(74) *Attorney, Agent, or Firm* — Foley & Lardner LLP

(57) ABSTRACT

A device for a passenger protection system of a vehicle is provided. The device comprises an oblong gas generator which is formed and provided to provide gas for inflating a gas bag in a case of activation, wherein the gas generator includes at least one firmly arranged stay bolt protruding from the shell surface of the gas generator, and a sleeve-shaped gas conducting element connected with the gas generator, which is formed and provided to divert gas flowing out of the gas generator and introduce the same into a gas bag to be inflated. The gas conducting element is connected with at least one of the stay bolts of the gas generator by means of a bayonet connector For forming a bayonet connector the gas conducting element forms at least one joining channel for the at least one stay bolt of the gas generator and in the region in which it forms the joining channel the gas conducting element at least partly includes a material reinforcement.

14 Claims, 12 Drawing Sheets

(56) References Cited

U.S. PATENT DOCUMENTS

| | | | |
|---|---|---|---|
| 5,427,406 A * | 6/1995 | Zushi et al. | 280/728.2 |
| 5,536,041 A | 7/1996 | Acker et al. | |
| 5,542,693 A * | 8/1996 | Koide | 280/728.2 |
| 5,913,536 A * | 6/1999 | Brown | 280/730.2 |
| 6,059,311 A * | 5/2000 | Wipasuramonton et al. | 280/729 |
| 6,152,484 A | 11/2000 | Fischer et al. | |
| 6,328,332 B1 * | 12/2001 | Schutz | 280/728.2 |
| 6,679,518 B2 | 1/2004 | Varcus et al. | |
| 7,048,297 B2 * | 5/2006 | Schneider | 280/728.2 |
| 7,597,351 B2 | 10/2009 | Kashiwagi | |
| 7,731,227 B2 * | 6/2010 | Hotta et al. | 280/730.2 |
| 7,758,065 B2 * | 7/2010 | Weigand et al. | 280/728.2 |
| 7,938,436 B2 * | 5/2011 | Lunt et al. | 280/728.2 |
| 8,286,992 B2 * | 10/2012 | Wagner et al. | 280/728.2 |
| 2004/0150202 A1 | 8/2004 | Goto | |
| 2005/0029784 A1 | 2/2005 | Siegel et al. | |
| 2008/0007035 A1 * | 1/2008 | Acker et al. | 280/742 |
| 2008/0129019 A1 | 6/2008 | Fangmann et al. | |
| 2008/0309055 A1 | 12/2008 | Buhrlen et al. | |
| 2009/0029590 A1 * | 1/2009 | Sykes et al. | 439/585 |
| 2009/0039627 A1 | 2/2009 | Yokota | |
| 2011/0042921 A1 * | 2/2011 | Kjell et al. | 280/728.2 |
| 2012/0043741 A1 * | 2/2012 | Yamamoto | 280/730.2 |
| 2012/0056410 A1 | 3/2012 | Yamamoto | |

FOREIGN PATENT DOCUMENTS

| | | |
|---|---|---|
| DE | 197 43 615 A1 | 4/1999 |
| DE | 102 11 232 A1 | 10/2003 |
| DE | 103 39 523 A1 | 3/2005 |
| DE | 10 2007 028 682 A1 | 12/2007 |
| DE | 10 2009 006 077 A1 | 7/2010 |
| EP | 1 954 534 B1 | 9/2009 |
| EP | 2 431 238 A1 | 3/2012 |
| WO | WO 03/059690 A2 | 7/2003 |
| WO | WO 2006/079330 S1 | 8/2006 |
| WO | WO 2010/131326 A1 | 11/2010 |
| WO | WO-2010/131518 A1 | 11/2010 |

OTHER PUBLICATIONS

International Search Report PCT/EP2011/062577 dated Dec. 2, 2011.

* cited by examiner

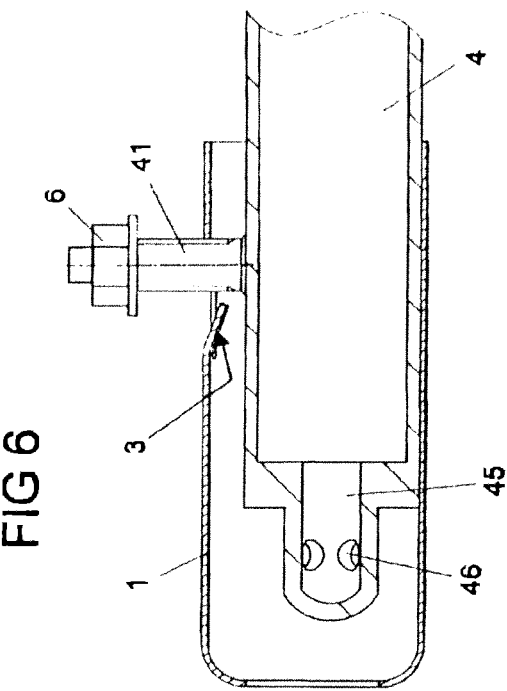
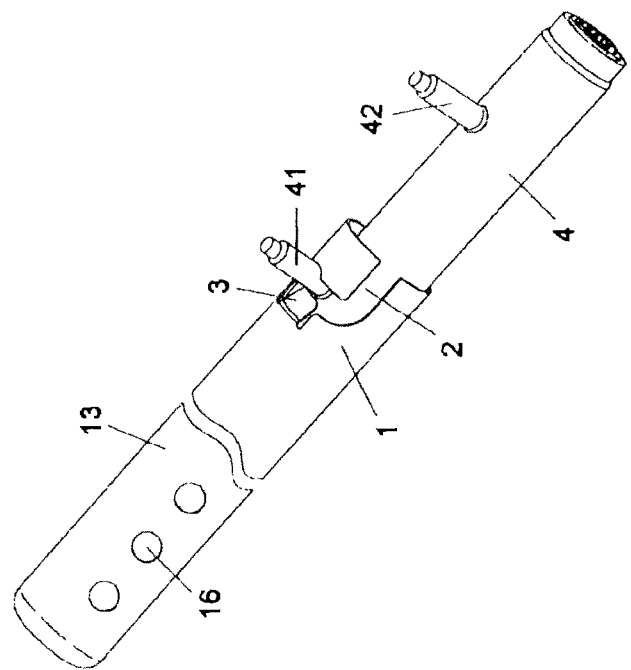

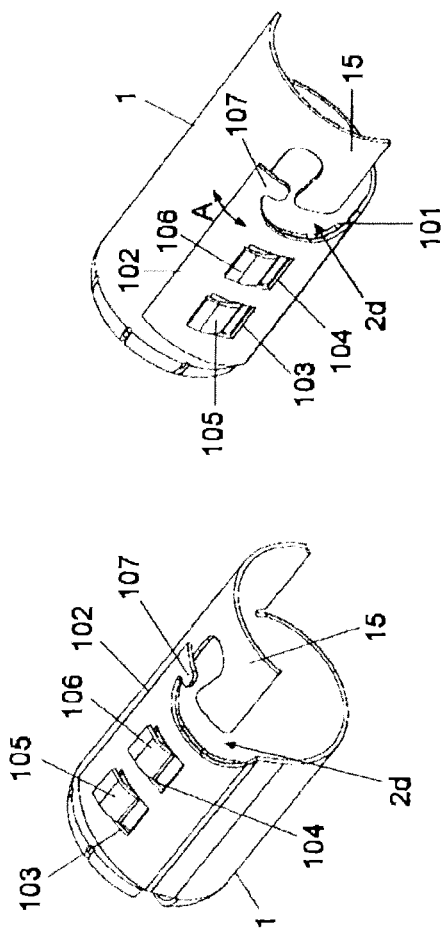

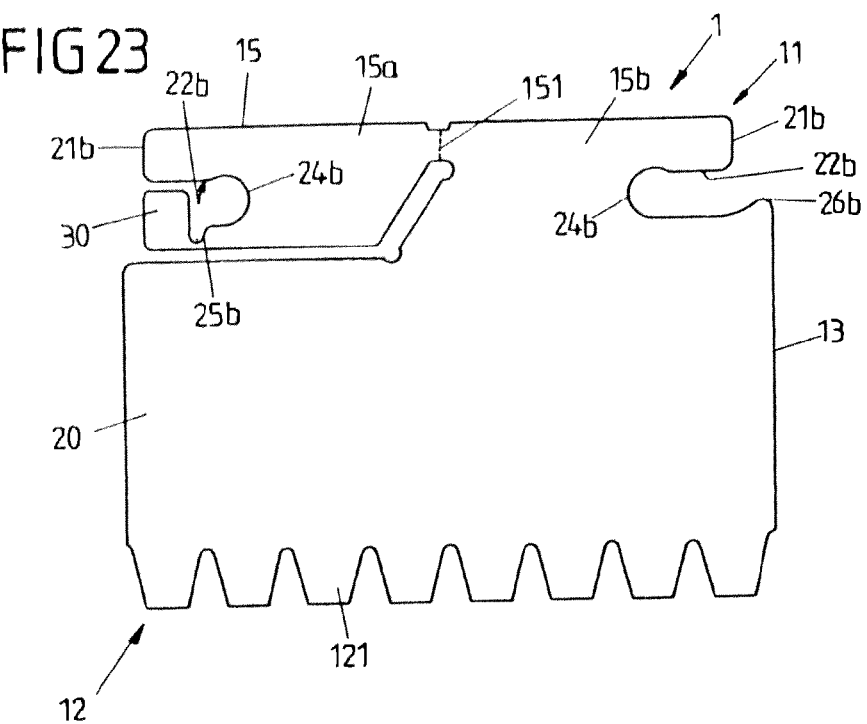
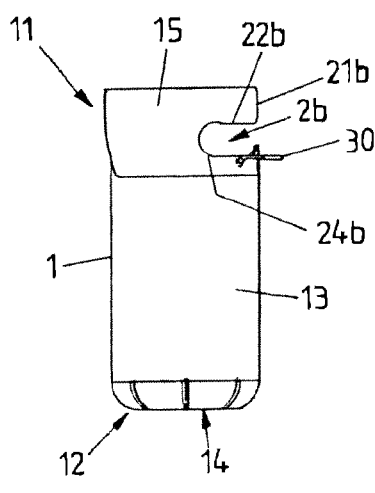
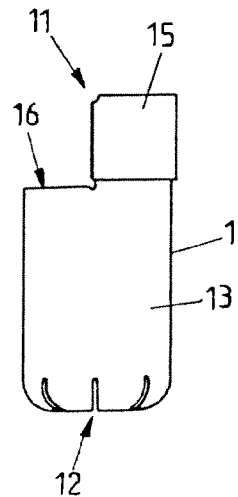

FIG 25A
FIG 25B
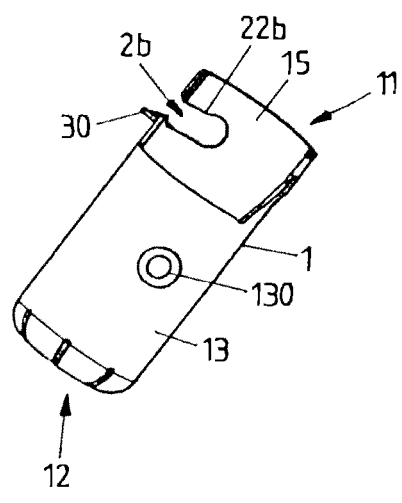
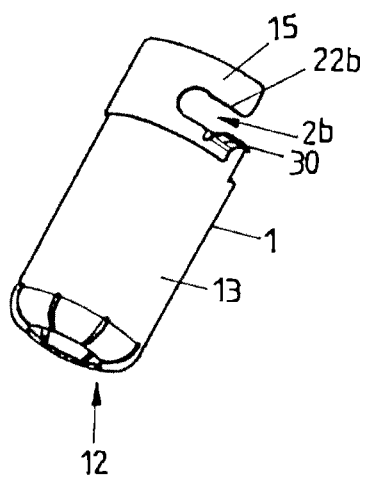

DEVICES FOR PASSENGER PROTECTION SYSTEMS OF A VEHICLE

CROSS-REFERENCE TO RELATED PATENT APPLICATIONS

This application is a continuation of International Patent Application Number PCT/EP2011/062577, filed on Jul. 21, 2011, which was published in German as WO 2012/025317. The foregoing international application is incorporated by referenced herein.

BACKGROUND OF THE INVENTION

This invention relates to devices for passenger protection systems of a vehicle.

In gas bag devices used as vehicle occupant restraint systems it generally is required to divert the gas flowing out of a gas generator in axial and/or radial direction into one or more particular directions, so that the gas can fill a gas bag uniformly and in a defined way. Furthermore, it generally is desirable that adjacent to the outflow openings of a gas generator the gas bag is not damaged by the outflowing gases.

For the solution of these problems it is known to introduce the gas flowing out of a gas generator into a gas bag by using a gas conducting element acting as mass flow distributor. It is known to farm such a gas conducting element as filling tube made of metal, as filling hose made of a variety of fabrics, as fabric diffusor or as rigid diffusor.

For attachment of a gas conducting element to a gas generator provided with a stay bolt it has been proposed to form a circular opening at the gas conducting element or a part connected with the same, into which a stay bolt of the gas generator is inserted. Such solutions are described in EP 1 954 534 B1, U.S. Pat. No. 7,597,351 B1, US 2009/0039627 A1 and US 2008/0007035 A1. However, they involve the disadvantage that for introducing the stay bolt into the circular opening, the gas conducting element and the gas generator must be tilted relative to each other or be moved relative to each other in transverse direction, which may be disadvantageous during assembly.

A generic device is known is known from the document DE 103 39 523 A1. For attachment of a gas conducting element to a gas generator provided with stay bolts, it is provided in this document to clamp the gas conducting element to a stay bolt. The clamping force is provided by an inherent resilience of the gas conducting element. This solution requires a particular configuration of the gas conducting element.

SUMMARY OF THE INVENTION

It is the object underlying the present invention to provide a further device for a passenger protection system of a vehicle, which allows for an attachment of a gas conducting element to a gas generator provided with stay bolts.

Accordingly, a first aspect of an exemplary embodiment of the invention provides that the gas conducting element is connected with at least one of the stay bolts of the gas generator by means of a bayonet connector. A bayonet connector is understood to be any kind of closure in which a connection of the gas conducting element with the stay bolt or the gas generator at least comprises an axial plug-in movement and a rotary movement effected substantially transversely to the same, i.e. in peripheral direction. This can be followed by further relative movements, until the stay bolt has reached its end position in the bayonet connector. The axial plug-in movement can, but need not be effected in guided form.

By connecting the gas conducting element with a stay bolt of the gas generator by means of a bayonet connector, a quickly realizable connection of the two parts becomes possible. For realizing a bayonet connector there is merely required an axial movement and a movement in peripheral direction, but not a tilting or transverse movement, so that there is only little space requirement during assembly.

In one exemplary aspect of the invention it is provided that for forming a bayonet connector the gas conducting element forms a joining channel for a stay bolt of the gas generator. This joining channel for example is formed such that it includes a first, substantially axially extending region and a second, substantially transversely extending region adjoining the first region. This can be followed by a third region adjoining the second region and in turn extending substantially axially. By the first region, the axial plug-in movement is effected in guided form. By the additional third region it is achieved that the connection is additionally secured. Thus, after the stay bolt has reached its end position at the end of the third region, the connection cannot be released again by merely rotating the gas conducting element. In particular, an inadvertent release of the connection by shaking movements is safely prevented thereby.

In a further exemplary aspect of the invention it is provided that the joining channel exclusively consists of a region extending substantially transversely to the longitudinal axis of the gas conducting element, which is formed on an axially protruding part of the gas conducting element. The axial plug-in movement of the gas conducting element with respect to the stay bolt, which forms the one part of a bayonet connector, is not effected in guided form, i.e. not in a channel or a cutout. When performing the axial plug-in movement, the stay bolt initially gets in abutment with the front end of the gas conducting element. This is followed by a rotary movement made in peripheral direction, which forms the other part of a bayonet connector, wherein the stay bolt is introduced into the joining channel of the protruding part.

In a further exemplary aspect of the invention it is provided that the gas conducting element includes means for locking the bayonet connector. The same may be formed in different ways. In one design variant, the means for locking the bayonet connector comprise a latching nose resiliently arranged or formed at the gas conducting element, which locks the stay bolt in place after reaching its end position in the bayonet connector. The latching nose protrudes into the joining channel, so that it is deflected when the stay bolt is inserted into the joining channel.

For realizing a resilient formation of the latching nose it can be provided, for example, that the gas conducting element consists of a rolled blank and the latching nose is molded to the blank. Two longitudinal edges of the blank overlap each other in the rolled condition, wherein the degree of overlap varies upon occurrence of a force occurring in peripheral direction. When introducing a stay bolt into the joining channel, the same exerts a force on the latching nose and hence on the blank, which acts in peripheral direction, which leads to a change in the degree of overlap of the longitudinal edges, whereby the latching nose bounces off. Alternatively, it can be provided that the latching nose is formed as resilient tongue in the region of the joining channel.

In a further exemplary design variant, the means for locking the bayonet connector comprise a tab arranged at the gas conducting element, which in the non-mounted condition obliquely protrudes into the interior of the gas conducting element and which on placing a nut or the like onto the stay bolt and tightening the nut is straightened and thereby additionally fixes the gas conducting element on the gas generator.

In a further exemplary design variant, the means for locking the bayonet connector comprise a bendable tab arranged at the gas conducting element, by means of which the bayonet connector can be secured by bending the tab after the end position of the stay bolt is reached.

In the region in which it forms the joining channel, the gas conducting element according to one design variant of the invention is at least partly formed by a tab axially protruding from the peripheral wall of the gas conducting element.

Furthermore, in the region in which it forms the joining channel, the gas conducting element according to one design variant of the invention at least partly includes a material reinforcement. Even with a low material thickness of the gas conducting element it can thus be ensured that forces occurring during the inflow of gas from the gas generator into the gas conducting element can safely be controlled.

One exemplary design variant thereof provides that a tab of the gas conducting element is formed by folding at least two tab parts onto each other or a material doubler is arranged on the tab, so that the tab has an increased material thickness as compared to the peripheral wall of the gas conducting element.

In a second aspect of an exemplary embodiment of the invention a connection of the gas conducting element with the gas generator is effected such that the gas conducting element includes at least one cutout into which a stay bolt of the gas generator is introduced when the gas conducting element is pushed onto the gas generator in axial direction. In this way, a certain fixation of the gas conducting element at the stay bolt of the gas generator is achieved to the effect that a rotary movement between the gas conducting element and the gas generator is prevented and an axial stop is provided by the end of the cutout.

According to the invention, the gas conducting element furthermore includes at least one securing element which is provided and formed to be hung into a further structure and thereby additionally secure the gas conducting element at the gas generator in axial direction. Hanging in can for example be effected into a module carrier or into a gas bag of a gas bag module. The securing element serves to additionally axially secure the gas conducting element at the gas generator during the inflow of gas from the gas generator into the gas conducting element and with the strong axial forces occurring in the process.

Hanging in the securing element into a further structure is to be understood such that the securing element is not firmly connected with the further structure. Separate fixing measures thus are not required. For example, the securing element is formed as tab which protrudes through a lug or opening of the structure and thereby is hung in.

Said cutout for example is formed oblong and aligned axially. Its width is at least as large as the diameter of the stay bolt, so that the same is arranged in the cutout without clamping.

In one exemplary configuration, the cutout is formed on a part axially protruding from the peripheral wall of the gas conducting element. For example, it is provided between two latching arms which protrude from the end face of the gas conducting element.

Furthermore, in one exemplary design variant, latching means are provided, by which a stay bolt introduced into the cutout is locked in place. When introducing the stay bolt into the cutout, the same thus additionally is locked in place in the cutout, so that at least with merely small axial forces there is also effected an axial fixation of gas conducting element and gas generator. The latching means for example are provided by inwardly extending protrusions formed on latching arms, which narrow the cutout in this region.

In one exemplary aspect of the invention, the securing element is formed by a hang-in tab, wherein the end of the hang-in tab points in a direction which is directed away from the gas generator. Hanging in thereby is made possible such that a protection against axial forces is given, which may be generated during the inflow of gas into the gas conducting element and push the gas conducting element away from the gas generator. The securing element can be arranged on the gas conducting element in a variety of ways, both at the front and on its circumference. It can be an integral part of the gas conducting element or be formed by a separate part attached to the gas conducting element.

According to one exemplary design variant, the cutout of the gas conducting element is formed in a part which extends in a first direction proceeding from its connection with the peripheral wall of the gas conducting element. Furthermore, the securing element extends in a second direction proceeding from its connection with the peripheral wall of the gas conducting element, wherein the first direction and the second direction are opposed. The securing element and the fixing element thus extend in opposite direction.

In a third aspect of an exemplary embodiment of the invention, a connection of the gas conducting element with the gas generator is effected such that the gas conducting element includes a substantially transversely extending joining channel, into which at least one of the stay bolts of the gas generator can be introduced by a rotary movement effected in circumferential direction, wherein the joining channel is at least partly formed on a part of the gas conducting element axially protruding at the front. The beginning of the joining channel is located at a lateral edge of the protruding part. By this variant of the invention a simple configuration is provided, since the joining channel only needs to be formed in one direction in the material of the gas conducting element.

The fact that the joining channel extends substantially transversely is to be understood such that it extends more strongly in transverse direction than in axial direction, which of course also includes the fact that it extends approximately exactly in transverse direction. The joining channel can be formed straight or bent.

In one exemplary design variant, the protruding part includes a bendable or flexible tab, by means of which the joining channel can be closed after introducing the stay bolt into the joining channel. For example, the tab first is bent up to clear the joining channel, and after introducing the stay bolt into the joining channel it is bent back, in order to again close the joining channel and secure the stay bolt in the joining channel against being released.

In a further exemplary design variant, the protruding part is formed by folding a partial region cut out in the material blank of the gas conducting element spread out flat, which is connected with the material blank only via a folding axis extending in axial direction, onto a partial region of the material blank formed substantially symmetrical thereto. In both partial regions, transversely extending regions of the joining channel are formed, which after folding the one partial region onto the other partial region come to lie one on top of the other.

It can be provided that the substantially transversely extending joining channel widens towards its end, for example by forming an approximately circular region. This can be associated with the advantage of a certain clearance between the gas conducting element and the gas generator in the locked condition.

A further exemplary embodiment of the invention provides that in the peripheral wall of the gas conducting element at least one point- or line-shaped constriction is formed, which provides a tilt protection of the gas conducting element with respect to the gas generator.

BRIEF DESCRIPTION OF THE DRAWINGS

The invention will be explained in detail below by means of several exemplary embodiments with reference to the Figures of the drawing.

FIG. 5 shows a schematic representation of a gas conducting element connected with a gas generator by a bayonet connector, wherein the gas conducting element is formed as gas conducting tube.

FIG. 6 shows a sectional representation of the arrangement of FIG. 5 by representing an additional locking of the gas conducting element with the gas generator.

FIG. 14 shows a further exemplary embodiment of a gas conducting element whose end is formed such that it is connectable with a stay bolt of a gas generator by means of a bayonet connector, wherein the gas conducting element includes a spring element for locking such stay bolt.

FIG. 15 shows the gas conducting element of FIG. 14, wherein the spring mechanism for the spring element is illustrated.

FIG. 23 shows a further exemplary embodiment of a sleeve-shaped gas conducting element which is shown in the unrolled condition as material blank.

FIG. 24A shows the sleeve-shaped gas conducting element, which is made by the blank of FIG. 23, in a first lateral view.

FIG. 24B shows the sleeve-shaped gas conducting element, which is made by the blank of FIG. 23, in a second lateral view.

FIG. 25A shows the gas conducting element of FIGS. 24A, 24B in a first perspective representation, wherein a local impression of the gas conducting element is visible.

FIG. 25B shows the gas conducting element of FIG. 25A in another perspective representation, in which an angled mounting tab of the gas conducting element is visible.

DETAILED DESCRIPTION OF THE PREFERRED EMBODIMENTS

Figure 1:
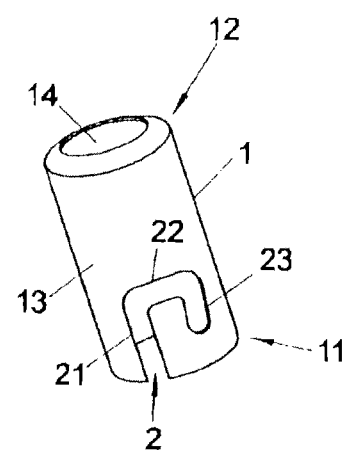
FIG. 1 shows a first exemplary embodiment of a sleeve-shaped gas conducting element whose one end is formed to be connected with a stay bolt of a gas generator by means of a bayonet connector.

FIG. 1 shows a sleeve-shaped gas conducting element 1. The gas conducting element 1 is provided to divert gas flowing out of a gas generator and guide the same into a gas bag in a desired way. It can be provided that the gas conducting element divides the gas stream provided by a gas generator into several partial streams. However, this is not compulsory. It can likewise be provided that the gas conducting element emits the gas stream substantially in one direction. These different design variants are defined by the distinguishing features that the gas conducting element includes one or more openings for the outflow of gas from the gas conducting element and/or the connection of the gas conducting element with a gas generator is formed substantially gas-tight or not gas-tight. If gas conducting elements are described in the following description, in which gas exits from the gas conducting element in a particular way, the skilled person will recognize that in these exemplary embodiments the gas exit from the gas conducting element also can be realized in some other way, without deviating from the fundamental concepts of the present invention, which relate to the attachment of a sleeve-shaped gas conducting element to a gas generator.

The gas conducting element 1 has a first end 11 and a second end 12. The first end 11 is provided to be connected with a tubular gas generator. The second end 12 is provided to direct gas discharged from a gas generator into a gas bag. Depending on how gas-tightly the first end 11 is connected with a gas generator, it can also be provided that gas exits through the first end 11 and is directed into a gas bag. Between the two ends 11, 12 the gas conducting element 1 is formed tubular, for which purpose it includes a cylindrical peripheral wall 13 provided with an internal bore 14.

At its first end 11a slot-shaped cutout 2 is realized in the gas conducting element 1, which forms a joining channel of bayonet connector. It is formed to form a bayonet connector together with a stay bolt of a gas generator and correspondingly has a width which allows to introduce such stay bolt into the cutout 2. The cutout 2 has a first region 21 extending axially with respect to the longitudinal axis of the gas conducting element 1, a region 22 extending in transverse direction (i.e. in peripheral direction), and an again axially extending, returning region 23. By axially putting the gas conducting element 1 onto a stay bolt of a gas generator, until the same reaches the end of the portion 21, a subsequent rotation of sleeve and stay bolt relative to each other, until the stay bolt reaches the end of the region 22, and a subsequent renewed axial shifting, until the stay bolt comes to abut on the end of the region 23, a bayonet connector can be realized.

The shape of the slot-shaped cutout 2 as shown in FIG. 1 for realizing the bayonet connector is to be understood by way of example only. In particular, the length and shape of the last region 23 also can be designed in some other way. The region 23 also can be omitted completely, in particular when the stay bolt additionally is secured in the cutout 2 of the gas conducting element by means of latching.

The gas conducting element 1 for example can be made of plastics or of metal. It can be formed as drawn or rolled part. The opening shown at the second end 12 also can be formed in another shape than shown, for example extend into the peripheral wall 13 in the form of a slot. There can also be provided exemplary embodiments in which the second end 12 is formed closed. The shape of the gas conducting element also is variable. For example, the same can be formed oval or conical instead of cylindrical, in particular when the regions of the gas conducting element, which are involved in the realization of a bayonet connector, are formed on a protruding tab, as is shown for example in FIG. 2. The gas conducting element 1 also can be formed as oblong gas conducting tube with a plurality of lateral gas outlet openings.

Figure 2:
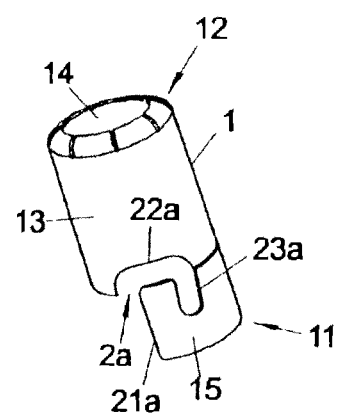
FIG. 2 shows a second exemplary embodiment of a sleeve-shaped gas conducting element whose one end is formed to be connected with a stay bolt of a gas generator by means of a bayonet connector, wherein the part of the gas conducting element which cooperates with the stay bolt of the gas generator is formed reinforced.
Figure 3:
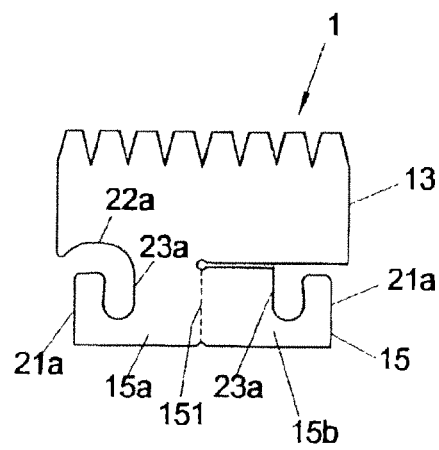
FIG. 3 shows the unrolled gas conducting element of FIG. 2.

FIGS. 2 and 3 show an alternative exemplary embodiment of a gas conducting element 1, with FIG. 3 showing the unrolled condition of the gas conducting element 1. The gas conducting element 1 likewise is formed cylindrical with a first end 11, a second end 12, a peripheral wall 13 and an internal bore 14. Other than in the exemplary embodiment of FIG. 1, the first end 11 is formed by a tab 15 axially protruding from the peripheral wall 13, which represents a part of the gas conducting element 1 axially protruding at the front. As can be taken from FIG. 3, the tab 15 is formed integrally with the peripheral wall 13. It includes two parts 15a, 15b axially symmetrical with respect to an axis 151, which are folded onto each other, whereby a reinforced tab 15 with twice the material thickness develops. The reinforcement can be effected to the inside or to the outside, i.e. the segment 15a can come to rest under the segment 15b or on top of the segment 15b. In both cases, a reinforcement of the region provided for the bayonet connector is provided, so that axial forces occurring in a case of activation also can safely be absorbed with a low material thickness of the gas conducting element 1.

Due to the provision of a reinforced tab 15 at the one end 11 of the gas conducting element 1, the slot-shaped cutout 2a is designed for accommodating a stay bolt of a gas generator such that the first axial region 21a is defined by the lateral edge of the tab 15, the transversely extending region 22a substantially is realized by a cutout in the peripheral wall 13, and the again axially extending region 23a is realized by cutouts in the two axially symmetrical tab parts 15a, 15b, so that this last region 23a, in which the stay bolt of the gas generator is positioned in the mounted condition, is formed reinforced. The axial plug-in movement between gas conducting element 1 and stay bolt is not effected in guided form, since the first axial region 21a only represents a lateral stop and no cutout delimited on both sides.

FIGS. 23 to 25B show a further exemplary embodiment of a gas conducting element 1, which is formed similar to the exemplary embodiment of FIGS. 2 and 3. FIG. 23 shows the unrolled condition of the gas conducting element 1 by representing a material blank 20.

The gas conducting element 1 in turn is formed cylindrical and has a first end 11, a second end 12, a peripheral wall 13 and an internal bore 14.

Similar to the exemplary embodiment of FIGS. 2 and 3, the first end 11 is formed by a protruding part 15, which according to FIG. 23 is formed by folding a partial region 15a cut out in the material blank 20 spread out flat onto a partial region 15b of the material blank 20 formed substantially symmetrical thereto. The cut-out partial region 15a only is connected with the material blank 20 via a folding axis 151 extending in axial direction.

Both in the partial region 15a and in the partial region 15b a transversely extending region 22b each is formed, wherein after folding the partial region 15a onto the partial region 15b the regions 22b come to lie one on top of the other and form a joining channel 2b.

The partial regions 15a and 15b largely are formed axially symmetrical with respect to the folding axis 151. A certain deviation from a complete axial symmetry on the one hand is given in that in the partial region 15a a bendable tab 30 is formed at its outer end in circumferential direction, which protrudes into the joining channel 2b or the transversely extending region 22b. By a material reduction 25b it is ensured that the tab 30 is bendably formed on the part 15a.

A further deviation from a complete axial symmetry exists in so far as the partial region 15b of the material blank 20 has a nose-like elevation 26b at the beginning of the transversely extending region 22b. The same is optional and can serve to more safely introduce a stay bolt into the joining channel 2b.

After folding the two partial regions 15a, 15b onto each other, a reinforced protruding part 15 with twice the material thickness is available. The reinforcement can be effected to the inside or to the outside, i.e. the partial region or segment 15a can come to rest under the partial region or segment 15b or on top of the partial region or segment 15b, depending on the folding direction. In both cases, a reinforcement of the region provided for the bayonet connector is provided, so that axial forces occurring in a case of activation also can safely be absorbed with a low material thickness of the gas conducting element.

The joining channel 2b widens towards one end. In the illustrated exemplary embodiment this is effected in that the end 24b is formed substantially circular. Widening can, however, also be effected in some other way, for example by a gradual increase in the width of the transversely extending region 22b. An advantage connected with a widening consists in that in the connected condition of the bayonet connector a certain clearance still exists between the gas conducting element 1 and the stay bolt or the gas generator. A widening of the joining channel 2b however is optional.

According to FIG. 23, a plurality of teeth 121 are provided at the second end 12 of the gas conducting element 1, which are bent in when manufacturing the gas conducting element 1.

The first end 11 of the gas conducting element 1, and the part 15 protruding there, forms the exclusively substantially transversely extending joining channel 2b. The lateral edge 21b of the protruding part 15 forms a stop in peripheral direction. It can be provided that a stay bolt to be introduced into the joining channel 2b is guided at this stop 21b in axial direction, until it gets into the joining channel 2b. An axial plug-in movement of the gas conducting element 1 with respect to a stay bolt to be introduced into the joining channel 2b can, however, also be effected completely in non-guided form, without the stay bolt being guided along the lateral edge 21b, but instead is moved in axial direction at a distance to the same. It should be noted that when carrying out the axial plug-in movement, the stay bolt will sometime get in abutment with the front end 16 of the sleeve-shaped peripheral wall 13, cf. FIG. 24B. Subsequently, a rotary movement then is effected in peripheral direction, with the stay bolt being introduced into the joining channel 2b of the protruding part 15.

FIGS. 25A and 25B show the gas bag element of FIGS. 24A, 24B in two different perspective representations. In the perspective representation of FIG. 25A it can be seen that the gas conducting element has a point-shaped impression 130 which represents a local constriction of the internal bore 14 of the gas conducting element 1. Such local impression 130 acts as tilt protection during the outflow operation of the gas. Instead of one, a plurality of such local impressions 130 can also be provided. At the same time, it should be noted that the same merely are optional. Such tilt protections also are described in FIGS. 20 to 22, to which reference is made in addition.

FIG. 25B shows the tab 30 explained with respect to FIG. 23. In FIG. 25B, the tab 30 is bent over to the outside, so that the joining channel 2b is cleared for accommodating a stay bolt. After introducing a stay bolt into the joining channel 2b, the tab 30 is bent back again, whereby the stay bolt is secured in the joining channel 2b and it is prevented that the gas conducting element 1 can work down from the bolt.

The design variant shown in FIGS. 23 to 25B can experience a wide variety of modifications. For example, the joining channel 2b can have another shape and/or be formed at another point of the protruding part 15. Latching of a stay bolt in the joining channel also can be effected in a way other than via the flexible tab 30. For example, the joining channel can include a constriction and/or a spring element can protrude into the joining channel. Locking also can be effected via tightening moments. Furthermore, it should be noted that the design of the gas conducting element 1 is not bound to a cylindrical shape. Alternatively, the same can formed e.g. oval or conical. The gas conducting element also can be formed with or without an opening at the front.

Furthermore, it should be noted that the formation of a reinforcement region by folding two partial regions of the material blank 20 onto each other should merely be understood by way of example. Alternatively, the material thickness can be chosen such that the axial forces also can be controlled without reinforcement. There can also be used material doublers, as will yet be described with reference to FIGS. 9A, 9B.

The gas conducting element 1 for example is made of sheet metal.

Figure 4:
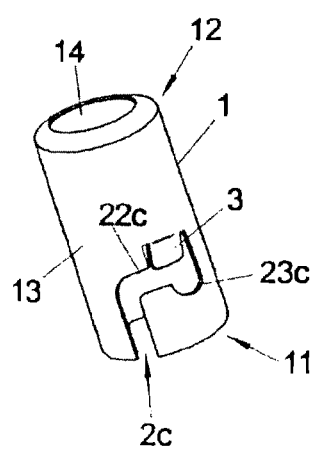
FIG. 4 shows a third exemplary embodiment of a sleeve-shaped gas conducting element whose one end is formed to be connected with a stay bolt of a gas generator by means of a bayonet connector, wherein the gas conducting element additionally includes a locking element.

FIG. 4 shows a further exemplary embodiment of a gas conducting element 1 which is connectable with a stay bolt of a gas generator by means of a bayonet connector. The exemplary embodiment of FIG. 4 largely is formed according to the exemplary embodiment of FIG. 1 and on the one hand differs from the last-mentioned in that the second axial region 23c of the slot-shaped cutout 2c is formed shorter. On the other hand a difference consists in that in the exemplary embodiment of FIG. 4 a locking element additionally is provided, which is formed by a tab 3 which in the non-mounted condition obliquely protrudes into the interior of the gas conducting element 1 and adjoins the slot-shaped cutout 2c such that at the end of the transversely extending region 22c, namely at the side which faces away from the first end 11, it defines the boundary of the transversely extending region 22c.

The locking function of a locking element formed such will be explained with reference to FIGS. 5 and 6. FIG. 5 shows a gas conducting element corresponding to FIG. 4 after being mounted on a gas generator 4. The gas generator 4 is formed as tubular gas generator and correspondingly has a substantially cylindrical shape. Two stay bolts 41, 42 are firmly welded to the circumference of the tubular gas generator 4. The stay bolts 41, 42 serve the attachment of the gas generator 4 to a vehicle structure, such as the frame of a vehicle seat or the vehicle chassis, or the attachment of the gas generator 4 to a carrier element which is connected with such a vehicle structure. In all illustrated exemplary embodiments they preferably include a screw connection, so that the bayonet connector can additionally be secured by a screwed-on nut.

It should be noted that in FIG. 5 the gas conducting element 1 at its end facing away from the gas generator 4—other than shown in FIG. 4—is formed as gas conducting tube with a plurality of gas outlet openings 16 formed laterally in the peripheral wall 13. This clearly shows that the gas conducting element 1 can be realized in a variety of configurations. The region of the gas conducting element 1, which serves the connection with the gas generator 4, however is formed corresponding to FIG. 4. The bayonet connector additionally is secured by a nut 6, which is wound on the threaded bolt 41, as is schematically shown in FIG. 6. The locking tab 3 straightens, when the nut 6 is tightened. The gas conducting element 1 thereby is additionally fixed on the threaded bolt 41.

In the configuration of FIG. 5, in which the gas conducting element 1 is formed as gas conducting tube, it can be provided that the gas conducting tube 1 performs 100% of the gas distribution. The gas conducting tube 1 thus is tightly seated on the gas generator 4 and exiting gas only flows into the tube. Such gas conducting tube for example can be used in door-integrated gas bag modules for a head protection or for a head and thorax protection.

In the partly sectional view of FIG. 6, it can be seen in addition that the tubular gas generator 4 forms a gas outlet port 45, on which gas outflow openings 46 are formed radially and in a thrust-neutral manner. The gas stream flowing out of the gas outlet openings 46 in radial direction is diverted by the gas conducting element 1 and directed into a non-illustrated gas bag. The gas outlet port 45 protrudes into the gas conducting element 1.

By the degree in which the outside diameter of the tubular gas generator 4 and the inside diameter of the gas conducting element 1 are adjusted to each other and by the extent to which the gas conducting element 1 is pressed against the gas generator 4 for example by means of the nut 6, the gas tightness of the connection between the gas conducting element 1 and the gas generator 4 can be adapted to the requirements. In particular, a complete gas tightness or alternatively a defined partial gas stream, which in the connecting region with the gas generator 4 flows out of the gas conducting element 1, can be provided.

FIGS. 7A, 7B, 8A, 8B, 8C and 9A, 9B show design variants of reinforced tabs 15 of a gas conducting element, which form a joining channel 2 or a part of the joining channel for a bayonet connector. The basic construction corresponds to that of FIG. 2. A reinforced tab 15 is advantageous to control the axial forces generated when gas flows out of the gas generator into the gas conducting element. Alternatively, the material thickness of the gas conducting element can be chosen such that the axial forces also are controllable without reinforcement.

Figure 7A:
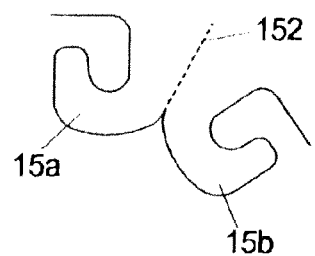
FIG. 7A shows two unfolded tab parts of a first design variant of a tab of a gas conducting element which is connectable with a stay bolt of a gas generator by means of a bayonet connector.
Figure 7B:
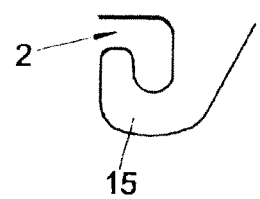
FIG. 7B shows the folded tab parts of the finished gas conducting element of the first design variant of FIG. 7A.

In the exemplary embodiment of FIGS. 7A, 7B, like in the exemplary embodiment of FIG. 2, a tab 15 is formed on the gas conducting element 1, which includes two mirror-symmetrical tab parts 15a, 15b. Other than in the exemplary embodiment of FIG. 2, the axis of symmetry and folding edge 152 does, however, not extend in circumferential direction, but obliquely. In principle, any angle can be realized.

Figure 8A:
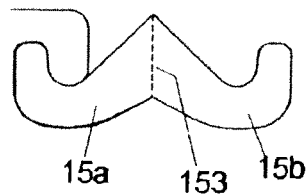
FIG. 8A shows two unfolded tab parts of a second design variant of a tab of a gas conducting element which is connectable with a stay bolt of a gas generator by means of a bayonet connector.
Figure 8B:
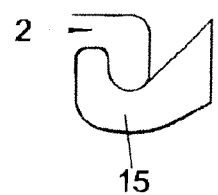
FIG. 8B shows the folded tab parts of the finished gas conducting element of the second design variant of FIG. 8A.
Figure 8C:
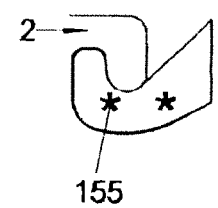
FIG. 8C shows a dotted connection by welding or the like of the two tab parts of the second design variant of FIG. 8A.

In the exemplary embodiment of FIG. 8A, the two minor-symmetrical tab parts 15a, 15b can be folded about an axially extending axis of symmetry and folding edge 153. FIG. 8B shows the folded condition and the reinforcement formed by the tab parts 15a, 15b lying one on top of the other. According to FIG. 8C, the folded parts 15a, 15b additionally can be connected with each other by punctual connections 155. Such point-shaped connections 155 for example can be provided by point welding. They allow a greater power transmission in the region of the stay bolt with a small surface area and minimum material thickness of the gas conducting element.

Figure 9A:
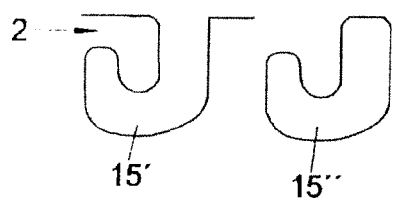
FIG. 9A shows a tab part and a material doubler of a third design variant of a tab of a gas conducting element which is connectable with a stay bolt of a gas generator by means of a bayonet connector.
Figure 9B:
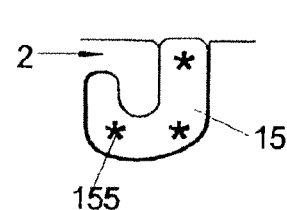
FIG. 9B shows a dotted connection by welding or the like of the two parts of the third design variant of FIG. 9A.

FIG. 9A shows a design variant in which on a tab 15' of the gas conducting element, which is indended to provide a joining channel 2 of a bayonet connector, an identically formed tab part 15'' is placed as material doubler and fixed in a suitable way. As shown in FIG. 9B, fixing for example in turn is effected via punctual connections 155, which are made for example by welding. A reinforced tab 15 develops.

It should be noted that the illustrated configurations of reinforcements formed by foldable or doubled tab parts in the region of the gas conducting element, which is connected with a stay bolt of the gas generator by means of a bayonet connector, should be understood by way of example only. For example, it can also be provided that a reinforcement is realized by repeated, possibly alternating folding. Moreover, it is not absolutely necessary that the respective folding parts are congruent.

Figure 10A:
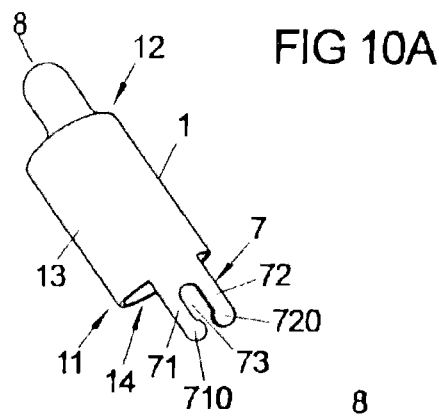
FIG. 10A shows a further exemplary embodiment of a gas conducting element, wherein the gas conducting element forms a pre-fixing element for a pre-fixation on a gas generator, and a hang-in tab.

In FIGS. 10A to 13, exemplary embodiments of a gas conducting element are described, which is connected with a gas generator not by means of a bayonet connector, but by pushing onto a gas generator and additional fixation. For this purpose, the exemplary embodiment of FIG. 10A provides a gas conducting element 1 which is formed tubular between a first end 11 and a second end 12 and includes a peripheral wall 13 provided with an internal bore 14. At the first end 11, a pre-fixing element 7 is arranged at the front, which serves the connection and pre-fixation of the gas conducting element 1 on a stay bolt of the gas generator. The pre-fixing element 7 includes two substantially axially extending parallel latching arms 71, 72 which form an oblong cutout 73 between themselves. The front ends of the latching arms 71, 72 have inwardly protruding protrusions 710, 720 which narrow the cutout 73 in this region.

At the other end 12 of the gas conducting element 1 there is formed a hang-in tab 8 likewise protruding at the front, which is provided to be hung in into a module carrier or into a gas bag and thereby additionally axially fix the gas conducting element 1 with respect to the gas generator 4.

Figure 10B:
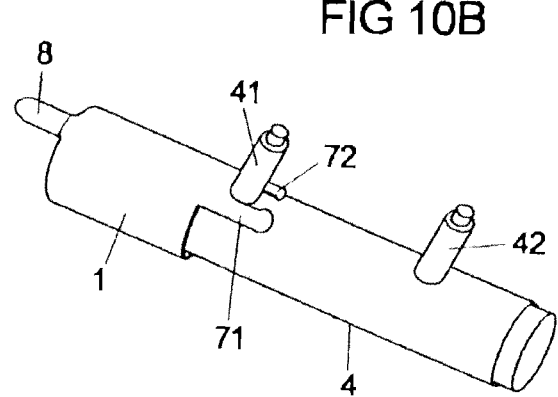
FIG. 10B shows the gas conducting element of FIG. 10A in the mounted condition on a gas generator.

FIG. 10B shows the gas conducting element of FIG. 10A in the condition mounted on a tubular gas generator 4 with stay bolts 41, 42. The connection is obtained by axially pushing the gas conducting element 1 onto the gas generator 4, with the stay bolt 41 being introduced into the cutout 73. The latching arms 71, 72 of the pre-fixing element 7 enclose the one stay bolt 41 of the gas generator 4 and in so far provide a pre-fixation and latching of the gas conducting element 1 on the gas generator 4. In one exemplary embodiment, this pre-fixation is additionally secured by means of a nut corresponding to the nut 6 of FIG. 6. Upon occurrence of great axial forces on the gas conducting element 1 in a case of activation, the pressing force of such nut and the latching provided by the two latching arms 71, 72 however is not sufficient to hold the gas conducting element 1 in axial position on the gas generator 4. The gas conducting element therefore is additionally fixed on a module carrier or gas bag by hanging in by means of the hang-in tab 8.

Figure 12:
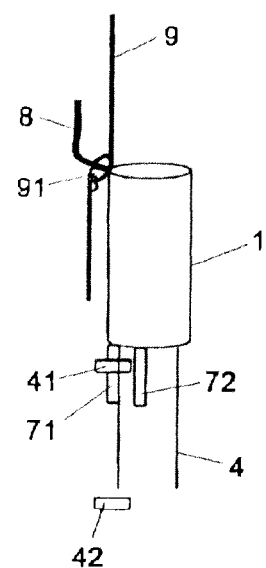
FIG. 12 shows an arrangement according to FIG. 10B, wherein the hang-in tab of the gas conducting element is guided through a gas bag or introduced into one or more gas bag layers or hung in into a fixing element.

A corresponding fixation is shown in FIG. 12 by way of example, which schematically represents the gas conducting element 1, the latching arms 71, 72, the gas generator 4 and the stay bolts 41, 42. It is also shown schematically how the hang-in tab 8 reaches through an opening 91 of a firm or flexible structure 9, which for example is a module carrier of a gas bag module, of which the gas generator 4 and the gas conducting element 1 form a part, or a fixing element of a gas generator. The hang-in tab 8 is guided through the opening 91 of the module carrier 9. The structure 9 likewise can be a gas bag, wherein the hang-in tab 8 can be guided through the gas bag as a whole or be introduced into one or more gas bag layers of the gas bag. The hang-in tab 8 preferably is hung into a region of the gas bag which remains locally unchanged during inflation of the gas bag.

Figure 11A:
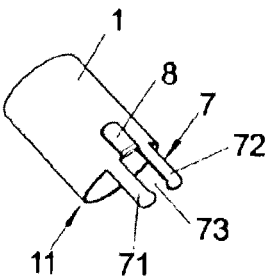
FIG. 11A shows a further exemplary embodiment of a gas conducting element, which forms a pre-fixing element for a pre-fixation on a gas generator, and a hang-in tab.
Figure 11B:
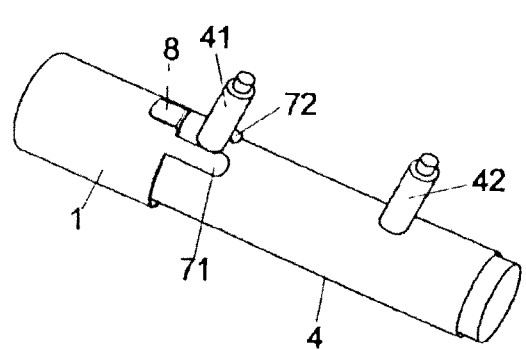
FIG. 11B shows the gas conducting element of FIG. 11A in a mounted condition on a gas generator.

FIGS. 11A and 11B show an alternative exemplary embodiment of a gas conducting element which on the one hand includes a pre-fixing element 7 and on the other hand a hang-in tab 8. In the exemplary embodiment of FIGS. 11A, 11B, the hang-in tab 8 like the pre-fixing element 7 is formed at the first end 11 of the gas conducting element 1 and formed by folding back a tab protruding at the front. At the same time, the oblong cutout 73 between the latching arms 71, 72 is formed thereby.

The pre-fixation of the pre-fixing element 7 at a stay bolt 41 of the tubular gas generator 4 is effected corresponding to FIG. 10B, so that reference is made to the respective explanations. In addition, hanging in of the hang-in tab 8 in turn is effected on a module carrier or on the gas bag and hence an additional axial fixation of the gas conducting element 1 at the gas generator 4.

Figure 13:
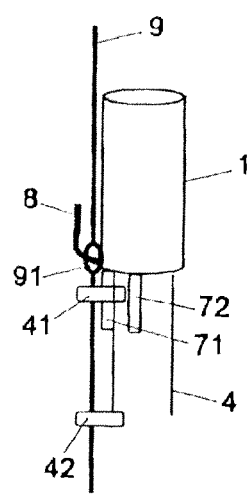
FIG. 13 shows an arrangement according to FIG. 11B, wherein the hang-in tab of the gas conducting element is guided through a gas bag or introduced into one or more gas bag layers or hung in into a fixing element.
Figure 16:
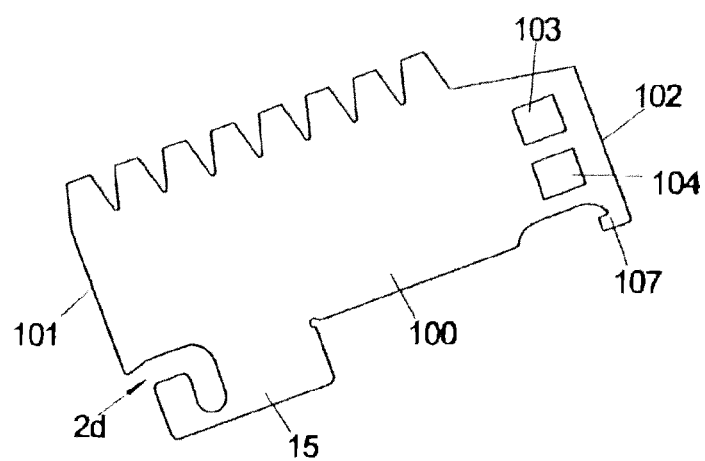
FIG. 16 shows the rolled-up gas conducting element of FIGS. 14 and 15.

The corresponding hang-in is schematically shown in FIG. 13 by way of example. Like in FIG. 12, the gas conducting element 1, the latching arms 71, 72, the gas generator 4 and the stay bolts 41, 42 are shown schematically. The hang-in tab 8 arranged and folded back at the first end 11 of the gas conducting element 1 is guided through an opening 91 of a firm or flexible structure 9 and thereby secures the gas conducting element 1 in axial direction. The structure 9 for example can be a module carrier of a gas bag module or a fixing element of a gas generator or a gas bag, wherein in the latter case the hang-in tab is guided through the air bag as a whole or can be introduced into one or more air bag layers.

FIGS. 14 to 17 show a further exemplary embodiment of a sleeve-shaped gas conducting element 1 which is connectable with a stay bolt of a gas generator by means of a bayonet connector. The sleeve-shaped gas conducting element 1 is formed by a metal blank 100 shown in FIG. 16, which is made for example by stamping and which is rolled up for forming the gas conducting element 1. It is provided that the two longitudinal edges 101, 102 of the blank extending in axial direction are not firmly connected with each other, but overlap each other and can move relative to each other like a spiral spring. The range of overlap of the two longitudinal edges 101, 102 for example is 40° to 60°.

By stampings 103, 104 in the region of the one edge 102 of the blank 100 and corresponding protrusions 105, 106 in the region of the other edge 101 of the blank 100 (the latter are shown in FIGS. 15A, 15B, but not in FIG. 16), which engage in each other, the overlap can be fixed.

The blank 100 furthermore includes a tab 15 similar to the tab 15 of FIG. 2, in which a slot-shaped cutout 2d is formed for realizing a joining channel of a bayonet connector. Furthermore, the blank 100 forms a latching nose 107 adjacent to the longitudinal edge 102. As can be seen in particular in FIG. 15, this latching nose 107 is movable in circumferential direction corresponding to the arrow A due to the spring-like configuration of the gas conducting element. It protrudes into the joining channel 2d.

When the gas generator 4 with its stay bolt 41 now is joined with the gas conducting element 1, the nose 107 can spring back when introducing the stay bolt 41, so that the stay bolt 41 can be moved to its intended end position. Subsequently, the nose 107 springs back, so that the stay bolt 41 is locked in place. Because in opposite direction, the latching nose 107 cannot spring back or only very little, since such movement is blocked by the protrusions 105, 106.

Figure 17:
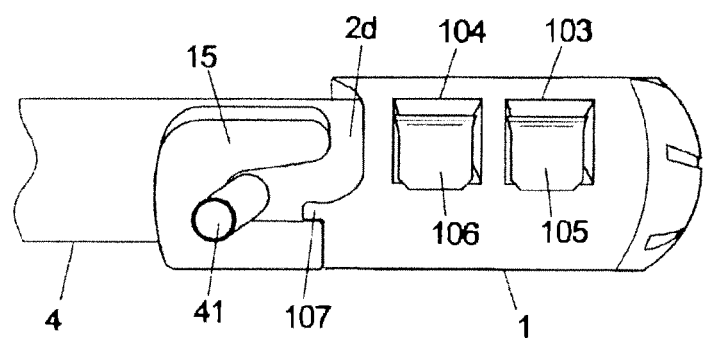
FIG. 17 shows the gas conducting element of FIGS. 14 and 15 connected with a gas generator.

FIG. 17 shows a perspective top view of the gas conducting element 1 connected with the gas generator 4 by means of a bayonet connector, which secures the stay bolt 41 in the joining channel 2d by the latching nose 107.

Figure 18B:
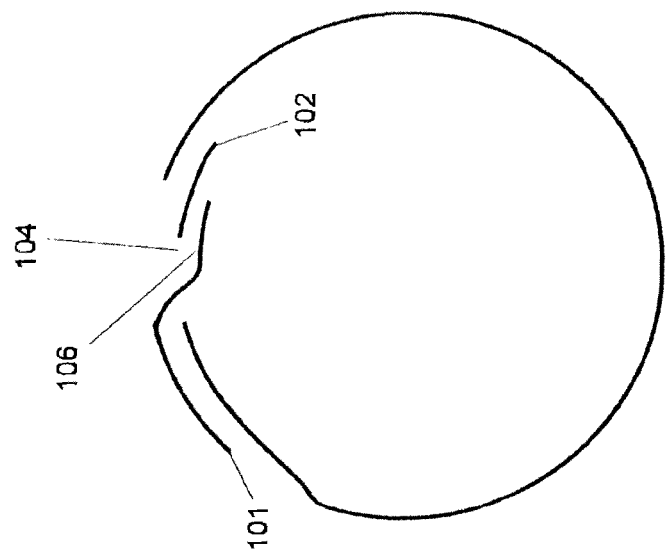
FIG. 18B shows a sectional representation of an alternative gas conducting element, in which the overlapping blank is guided to the inside.
Figure 18A:
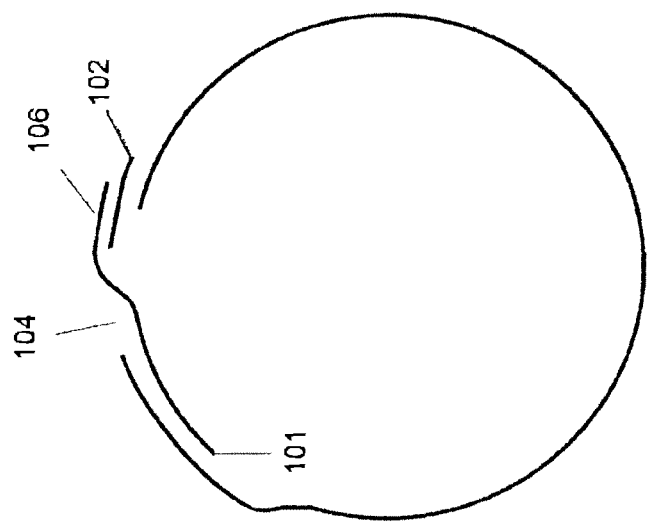
FIG. 18A shows a sectional representation of the gas conducting element of FIG. 14, wherein the overlapping blank rests on the outside.

FIG. 18A shows a sectional view of the gas conducting element 1 of FIG. 14, with the section being made in a region in which the one stamping 104 and the corresponding protrusion 106 are realized. It can be seen that the protrusion 106, which protrudes like a tab, is set to the outside and correspondingly protrudes to the outside. The same applies to the protrusion 105 and the stamping 103.

FIG. 18B shows an alternative configuration, which in principle is formed corresponding to FIGS. 14 to 17, in which the overlapping portion however is guided to the inside. The stamping 104 is located in the inner arc. The tab-like protrusion 106, which reaches through the stamping 104, is guided from the outer arc into the inner arc. Thus, it extends through the stamping 104 to the inside. The same applies to the protrusion 105 and the stamping 103.

An advantage of this configuration consists in that a deploying gas bag cannot be damaged by the protrusions 105, 106 due to their arrangement on the inside. The protrusions 105, 106 also can be dimensioned such that during inflow of gas from the gas generator 4 into the gas conducting element 1 and with a related force acting on the positive connections formed by the protrusions 105, 106 and cutouts 103, 104, which can lead to an at least partial erection of the protrusions 105, 106, such erected protrusions 105, 106 protruding to the inside then support on a gas generator 4 arranged inside the gas conducting element 1, so that an improved support on the gas generator 4 is realized.

Figure 19:
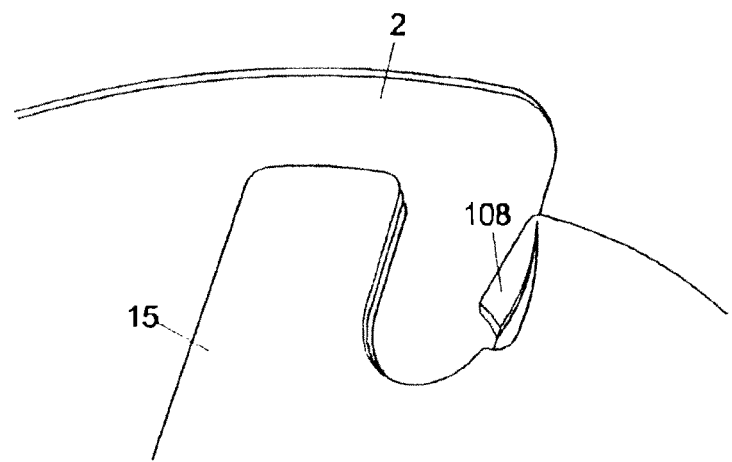
FIG. 19 shows a further exemplary embodiment of a gas conducting element, which forms a latching nose in the region which forms the part of a bayonet connector.

FIG. 19 shows a design variant in which a resilient tongue 108 is molded in the region of the joining channel 2, which serves the guidance of the stay bolt 41 of the gas generator 4, in order to lock the stay bolt 41 in its end position. The resilient tongue 108 is formed adjacent to the end position of the stay bolt 41 in the joining channel 2. For example, it is stamped out from the surrounding material and formed correspondingly.

In this design variant, too, the stay bolt 41 can easily be joined with normal hand force. The reverse path, however, is blocked by the tongue 108 sprung back.

In the exemplary embodiment of FIG. 19, the resilient tongue 108 is molded to a tab 15 (corresponding to the tab 15 of FIG. 2 or the tab 15 of FIGS. 13 to 17). It blocks the stay bolt of the gas generator, after the same has been brought into its end position in the joining channel 2.

Figure 20:
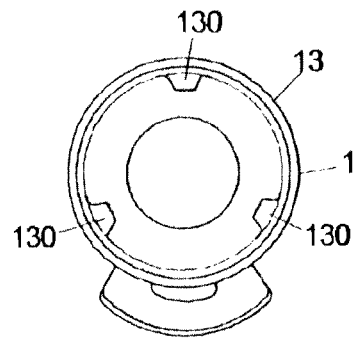
FIG. 20 shows a front view of a gas conducting element which is formed to be connected with a gas generator by means of a bayonet connector, wherein the gas conducting element includes a plurality of local impressions for the additional fixation of the gas conducting element with respect to the gas generator.
Figure 21:
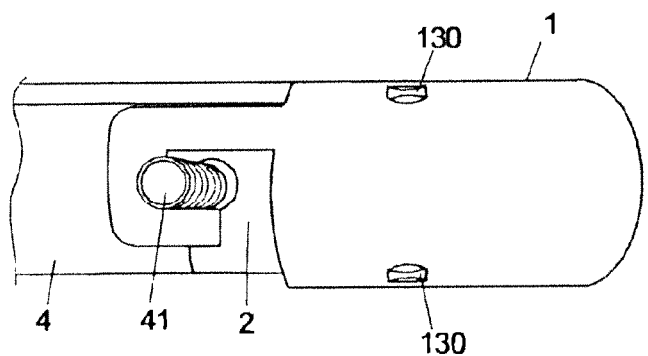
FIG. 21 shows a top view of the gas conducting element of FIG. 20 connected with a gas generator by means of a bayonet connector, wherein two local impressions can be seen.
Figure 22:
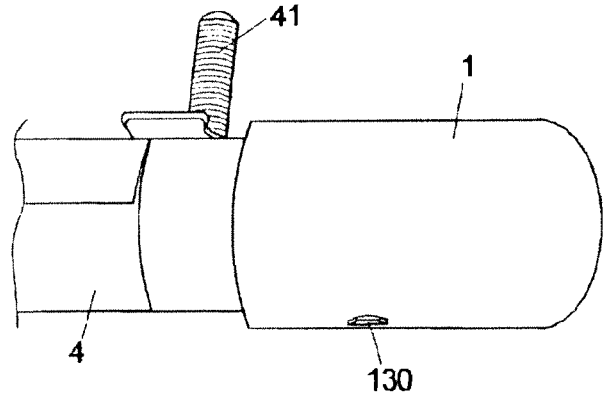
FIG. 22 shows an alternative exemplary embodiment of the connection of a gas conducting element with a gas generator by means of a bayonet connector, wherein merely one local impression opposite a stay bolt is provided for the additional fixation of the gas conducting element on the gas generator.

FIGS. 20 to 22 relate to configurations in which a sleeve-shaped gas conducting element 1 is connected with a tubular gas generator 4 by means of a bayonet connector. In the peripheral wall 13 of the gas conducting element 1 one or more local impressions 130 are provided, which protrude into the interior of the sleeve 1. The local impressions 130 are made into the sleeve-shaped gas conducting element 1, before the same is placed onto the gas generator 4. At the gas generator 4, there is not provided a counter-profile corresponding to the local impressions 130; rather, its shell surface is formed cylindrical in the usual way.

The local impressions 130 represent punctual constrictions. They serve an additional fixation of the gas conducting element 1 at the gas generator 4 and act as tilt protection during the outflow operation of the gas. A tilting of the gas conducting element 1 with respect to the gas generator 4 thus is prevented. The end of the gas conducting element 1, which is connected with the gas generator 4, is not formed gas-tight, since gas can flow laterally past the local impressions 130. The other end of the gas conducting element 1 can be formed open or closed.

FIG. 21 shows the gas conducting element of FIG. 20 as mounted on a gas generator 4. Beside the bayonet connector, two of three local impressions 130 can be seen, which act as tilt protection.

The number of the local impressions 130 can vary. In the exemplary embodiment of FIG. 22 only a single local impression 130 is provided. The same is formed opposite, i.e. offset by 180° relative to the stay bolt 41 in the gas conducting element 1. A tilt protection also is achieved thereby.

In other configurations, the gas conducting element 1 includes line-shaped constrictions instead of punctual constrictions, which can extend axially, radially and/or obliquely. One or more of such line-shaped constrictions can be provided. In the case of a radially extending constriction of the gas conducting element, gas tightness also might be provided at the end of the gas conducting element 1 connected with the gas generator.

In one exemplary embodiment, the gas conducting element according to the invention is inserted in a side air bag module, in particular in a side air bag module with a two-chamber side gas bag, wherein the gas conducting element is formed such that gas flowing out of the gas generator is diverted in two directions.

The priority application, German Patent Application Number 10 2010 039 902.7, filed Aug. 27, 2010 is incorporated by referenced herein.

What is claimed is:

1. A device for a passenger protection system of a vehicle, which comprises:
   an oblong gas generator which is formed and provided to provide gas for inflating a gas bag in the case of activation, wherein the gas generator includes at least one firmly arranged stay bolt protruding from a shell surface of the gas generator,
   a sleeve-shaped gas conducting element connected with the gas generator, which is formed and provided to divert gas flowing out of the gas generator and guide the same into a gas bag to be inflated, wherein
   the gas conducting element is connected with at least one of the stay bolts of the gas generator by means of a bayonet connector,
   for forming a bayonet connector the gas conducting element forms at least one joining channel for the at least one stay bolt of the gas generator, and
   in the region in which it forms the at least one joining channel the gas conducting element is at least partly formed by a tab axially protruding from a peripheral wall of the gas conducting element,
   wherein the gas conducting element includes means for locking the bayonet connector,
   wherein the means for locking the bayonet connector comprise a bendable tab arranged at the gas conducting element, by means of which the bayonet connector can be secured by bending the bendable tab after reaching the end position of the stay bolt is reached.

2. The device according to claim 1, wherein the joining channel forms a first, substantially axially extending region, a second, substantially transversely extending region adjoining the first region, and a third, substantially axially extending region adjoining the second region.

3. The device according to claim 1, wherein the joining channel exclusively consists of a region extending substantially transversely to the longitudinal axis of the gas conducting element, which is formed on a protruding part of the gas conducting element.

4. A device for a passenger protection system of a vehicle, which comprises:
   an oblong gas generator which is formed and provided to provide gas for inflating a gas bag in the case of activation, wherein the gas generator includes at least one firmly arranged stay bolt protruding from a shell surface of the gas generator,
   a sleeve-shaped gas conducting element connected with the gas generator, which is formed and provided to divert gas flowing out of the gas generator and guide the same into a gas bag to be inflated, wherein
   the gas conducting element is connected with at least one of the stay bolts of the gas generator by means of a bayonet connector,
   for forming a bayonet connector the gas conducting element forms at least one joining channel for the at least one stay bolt of the gas generator, and
   in the region in which it forms the at least one joining channel the gas conducting element is at least partly formed by a tab axially protruding from a peripheral wall of the gas conducting element,
   wherein in the region in which it forms the joining channel the gas conducting element at least partly includes a material reinforcement,
   wherein the tab is formed by folding at least two tab parts onto each other or a material doubler is arranged on the tab, so that the tab has an increased material thickness as compared to the peripheral wall of the gas conducting element.

5. A device for a passenger protection system of a vehicle, which comprises:
   an oblong gas generator which is formed and provided to provide gas for inflating a gas bag in the case of activation, wherein the gas generator includes at least one firmly arranged stay bolt protruding from a shell surface of the gas generator,
   a sleeve-shaped gas conducting element connected with the gas generator, which is formed and provided to divert gas flowing out of the gas generator and introduce the same into a gas bag to be inflated,
   wherein the gas conducting element includes a substantially transversely extending joining channel into which at least one of the stay bolts of the gas generator can be introduced by a rotary movement effected in peripheral direction, wherein the joining channel is at least partly formed on a part of the gas conducting element axially protruding at a front of the gas conducting element,
   wherein the protruding part includes a bendable or flexible tab by means of which the joining channel can be closed after introducing the stay bolt into the joining channel.

6. A device for a passenger protection system of a vehicle, which comprises:
   an oblong gas generator which is formed and provided to provide gas for inflating a gas bag in the case of activation, wherein the gas generator includes at least one firmly arranged stay bolt protruding from a shell surface of the gas generator,
   a sleeve-shaped gas conducting element connected with the gas generator, which is formed and provided to divert gas flowing out of the gas generator and introduce the same into a gas bag to be inflated,
   wherein the gas conducting element includes a substantially transversely extending joining channel into which at least one of the stay bolts of the gas generator can be introduced by a rotary movement effected in peripheral direction, wherein the joining channel is at least partly formed on a part of the gas conducting element axially protruding at a front of the gas conducting element,
   wherein the protruding part is formed by folding a partial region cut out in the material blank of the gas conducting element spread out flat, which is connected with the material blank only via a folding axis extending in axial direction, onto a partial region of the material blank formed substantially symmetrical thereto, wherein in both partial regions transversely extending regions of the joining channel are formed, which after folding the one partial region onto the other partial region come to lie one on top of the other.

7. The device according to claim 5, wherein the substantially transversely extending joining channel widens towards its end.

8. The device according to claim 5, wherein in a peripheral wall of the gas conducting element at least one punctual- or line-shaped constriction is formed, which provides a tilt protection of the gas conducting element with respect to the gas generator.

9. The device according to claim 5, wherein the substantially transversely extending joining channel widens towards its end by forming an approximately circular region.

10. The device according to claim 6, wherein the substantially transversely extending joining channel widens towards its end.

11. The device according to claim 6, wherein in a peripheral wall of the gas conducting element at least one punctual- or line-shaped constriction is formed, which provides a tilt protection of the gas conducting element with respect to the gas generator.

12. The device according to claim 6, wherein the substantially transversely extending joining channel widens towards its end by forming an approximately circular region.

13. The device according to claim 4, wherein the joining channel forms a first, substantially axially extending region, a second, substantially transversely extending region adjoining the first region, and a third, substantially axially extending region adjoining the second region.

14. The device according to claim 4, wherein the joining channel exclusively consists of a region extending substantially transversely to the longitudinal axis of the gas conducting element, which is formed on a protruding part of the gas conducting element.

* * * * *